June 12, 1962  J. F. EGAN ET AL  3,038,437

SHUTTER INDICATOR

Filed March 1, 1960

JOHN F. EGAN
KENWOOD F. BLOCK
INVENTORS

BY R. Frank Smith

Paul W. Holmes

ATTORNEYS

United States Patent Office 3,038,437
Patented June 12, 1962

3,038,437
SHUTTER INDICATOR
John F. Egan and Kenwood F. Block, Rochester, N.Y., assignors to Eastman Kodak Company, Rochester, N.Y., a corporation of New Jersey
Filed Mar. 1, 1960, Ser. No. 12,207
7 Claims. (Cl. 116—114)

This invention relates to a signaling device and more particularly to a device for visually indicating the condition of a shutter for a photographic apparatus.

Many of the known prior art signaling devices which have been used in conjunction with various photographic apparatus for indicating conditions such as film movement, breakage or exhaustion, are of the type which include electric lamps or alarms which are energized in response to the occurrence of a given mechanical condition within the apparatus. Besides the relatively high expense which is normally involved in manufacturing and installing such signaling devices, they have the further disadvantage of occasionally breaking down without warning and thereafter fail to give the desired signal at the appropriate time. Some of the mechanical signaling devices of the known prior art, of which there are many, have been quite complex, require critical adjustment, and are sometimes unreliable or ineffective to provide a recognizable signal. The signaling device of the present invention overcomes these many disadvantages and comprises broadly light-conducting means positioned to conduct light to an element which is located in a darkened area and which, in one of its operating positions, reflects the light back through the light-conducting means to illuminate the exposed end thereof.

The primary object of the present invention is therefore to provide a signaling device for indicating the position of an element which is located in a darkened area within an apparatus.

Another object of the present invention is to provide a device for visually indicating the condition of a shutter which is normally concealed from view within a photographic apparatus.

Still another object of the present invention is to provide an optical device for visually indicating the condition of a shutter within a photographic apparatus and which is relatively inexpensive to manufacture and is completely reliable in use.

Still other objects and advantages of the present invention will become readily apparent to those skilled in the art from the following description with reference to the drawing in which like characters denote like parts, and wherein.

Figure 1:
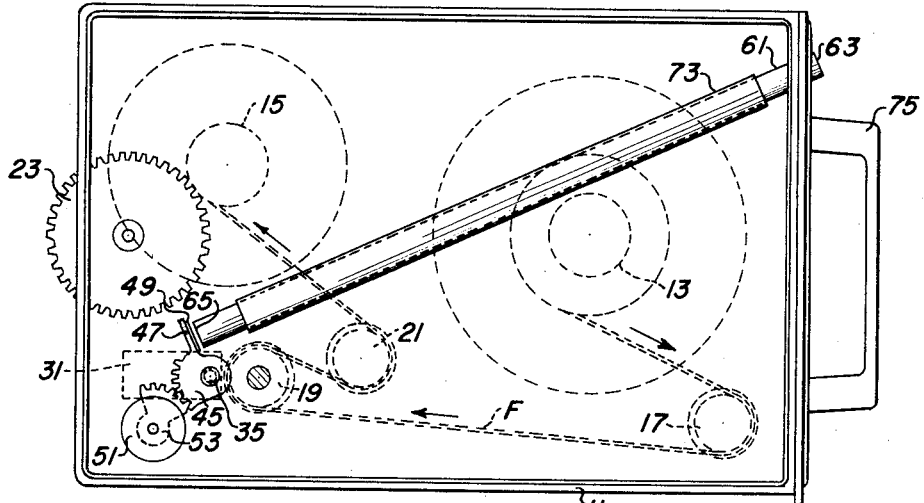
FIG. 1 is an elevation view showing the signaling device of the present invention as it is used in a photographic apparatus to indicate the condition of a shutter.
Figure 3:
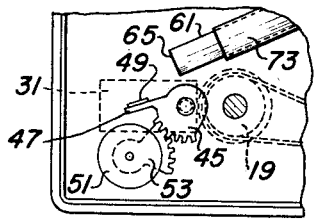
FIG. 3 is a fragmentary elevation view showing the relationship of some of the parts of the photographic apparatus when the shutter is in an operating position different from that shown in FIG. 1; and, FIG. 4 is an enlarged perspective view of the shutter of the photographic apparatus, part of the shutter being broken away to better illustrate the construction.

While the signaling device of the present invention will be described as a device for visually indicating the condition of the shutter of a photographic apparatus, the signaling device obviously could be utilized for visually indicating the position of an element normally obscured from view in many other and different apparatus without departing from the spirit of the present invention. The numeral 11 designates a film unit having a light-excluding cover 12 shown in FIG. 2 but not shown in FIGS. 1 and 3 to facilitate the disclosure and another light-excluding cover (not shown) on the side opposite cover 12. Film unit 11 is of the type which is commonly utilized in many of the currently manufactured microfilming apparatus and comprises one or more supply spools 13, each containing a wound supply of film F, and one or more take-up spools 15. In use, films F are withdrawn from supply spools 13, over the supply float rollers 17, around film drive rollers 19, over take-up float rollers 21, and onto the take-up spools 15. As is well known, film units of the type disclosed may be utilized to record identical images on one or two films simultaneously as desired. The mounting details for these rollers and spools, and the gearing which is utilized to drive the same are well known to those skilled in the art, and since they do not form a part of the present invention, will not be described in detail herein. Gear 23 is driven by another gear mounted externally of the film unit 11 and forms the first gear of the train which functions to move the film F as described above.

Figure 2:
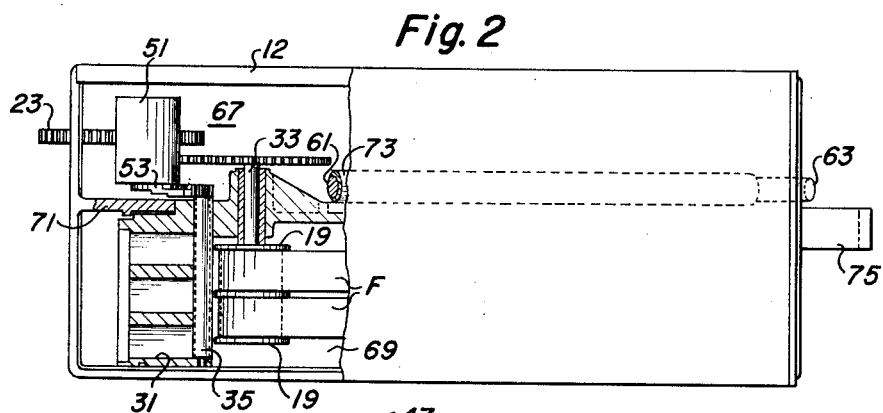
FIG. 2 is a bottom view of the photographic apparatus which is partly broken away to better illustrate the same.
Figure 4:
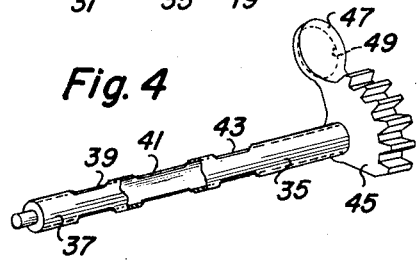

Film unit 11 also includes a lens block 31 which carries three lenses (not shown) for focusing the images to be recorded on the films F as they move around the film drive rollers 19. As illustrated in FIG. 2, the shaft 33 for the film drive rollers 19, and the shutter 35 are mounted in bearings carried by the lens block 31 whereby alignment of the lenses, shutter, and film drive rollers is more easily obtained. Shutter 35 is a rotary barrel type shutter comprising a tubular member 37 through which the slots 39, 41 and 43 are formed. A sector 45 is fixed on one end of member 37. Sector 45 is provided with an extension 47, one surface of which may be coated with a reflective material 49 such as, for example, red fluorescent paint. A rotary solenoid 51, including a sector 53 in engagement with sector 45, is utilized to selectively rotate shutter 35 to an open or image-passing condition, i.e. a position at which the light images focused by the lenses (not shown) in the lens block 31 pass through slots 39, 41 and 43 and are recorded on the films F, or to a closed or image-blocking condition, i.e. a position at which the light images are prevented from passing through the shutter 35 by the nonslotted surface of member 37 and are not recorded on films F.

The signaling device of the present invention comprises a light conducting rod 61 which is made of any transparent glass or plastic material which exhibits the desired light-conducting characteristics. Two such materials are known to the trade as Lucite and Plexiglas. Rod 61 is positioned with one end 63 exposed to view and with the other end 65 located within the film unit so that extension 47 with its coating 49 is juxtaposed to end 65 when shutter 35 is in an image-blocking condition. The inner cavity 67 of film unit 11 is closed by cover 12 and, except for light entering from rod 61, does not receive any light. Of course cavity 69, which contains the films F and is located on the other side of wall 71, is completely dark, all stray light being excluded therefrom. The light-conducting rod 61 is substantially enclosed with a wrapping of white paper 73 for reasons which will be hereinafter set forth. A handle 75 is attached to the front face of the film unit 11 in order to facilitate removing the film unit from the photographic apparatus (not shown) with which it is designed to be used.

The operation of the signaling device of the present invention will now be described. In use, the end of the film unit 11 with the handle 75 is located in a position at which it may be seen by the operator. Some of the existing light from the environment of the photographic apparatus enters the rod 61 through end 63 and is transmitted by the rod through end 65. When shutter 35 is in the image-blocking condition, extension 47 is in the position shown in FIG. 1, and the light which leaves the end 65 of rod 61 strikes the reflective coating 49 on extension 47, is reflected back into the rod through end 65, and is transmitted by the rod to end 63 thereby illuminating end 63 and forming a visible light signal which is the same color as coating 49. However, when shutter 35 is in the image-passing condition, then extension 47 is in the position shown in FIG. 3 and the light which is transmitted to end 65 of rod 61 is dissipated in the film unit 11 without being reflected back, to any appreciable extent, through rod 61, and end face 63 is dark. When the rod 61 is wrapped with a light-reflecting covering such as white paper 73, the light loss from the exterior peripheral surface of the rod 61 is substantially eliminated with the result that the visible signal which appears on end 63 when the extension 47 is adjacent to end 65, has maximum brilliancy.

It should now be apparent to those skilled in the art that the signaling device of the present invention is relatively simple in construction, is inexpensive to manufacture and is completely reliable in use because it does not depend for its operation upon any mechanism other than the light transmission characteristics of a light-conducting material. Many modifications and other embodiments of the present invention are possible and will become readily apparent to those skilled in the art from the foregoing description; and this description, therefore, is intended to be illustrative only and the scope of the invention is defined in the appended claims.

Having now particularly described our invention, what we desire to secure by Letters Patent of the United States and what we claim is:

1. A device for visually indicating a position of an element which is located in a darkened area and which is movable between a first position and at least one other position spaced from said first position, said device comprising a light reflecting surface on said element, and light-conducting means having a first end located in a visible position and a second end so located in relation to said surface, that light transmitted by said conducting means through said second end is reflected, whenever said element is in one of said positions, by said surface back through said conducting means to illuminate said one end thereof and provide a visible signal.

2. An indicating device in accordance with claim 1 and wherein said surface is colored whereby said visible signal is similarly colored and more easily discerned.

3. An indicating device in accordance with claim 1 and wherein said conducting means exclusive of said ends is substantially encased in a light-reflecting covering substantially eliminating light loss from said exterior surface except through said ends.

4. In a photographic apparatus, the combination of a shutter which is selectively operable to a light-blocking condition and a light-passing condition, and a device for visually indicating the condition of said shutter, said indicating device comprising an element operatively associated with said shutter in an area within said apparatus from which most light is excluded, and moving simultaneously with the actuation of said shutter to one of two spaced positions depending upon the condition of said shutter, a light-reflecting surface on said element, light-conducting means having two end faces, and means for mounting said conducting means with one of said faces exposed to view and the other face in juxtaposed relation to said surface when said element is in one of said positions, whereby light transmitted by said conducting means through said other face is reflected, whenever said shutter is in a condition at which said surface is juxtaposed to said other face, by said surface back through said conducting means to illuminate said one face thereof and provide a visible signal.

5. The combination in accordance with claim 4 in which said surface comprises a light-reflecting colored coating on said element whereby said visible signal is similarly colored and more easily discerned.

6. The combination in accordance with claim 5 wherein the exterior surface of said conducting means exclusive of said faces is substantially encased in a light-reflecting covering for substantially eliminating light loss from said exterior surface except through said faces.

7. The combination in accordance with claim 6 wherein said coating is a fluorescent material and wherein said conducting means is an elongate member and said light-reflecting covering comprises a strip of white paper which is wound around said elongate member.

References Cited in the file of this patent

UNITED STATES PATENTS

| 2,347,665 | Christensen et al. | May 2, 1944 |
| 2,841,064 | Bagly | July 1, 1958 |

OTHER REFERENCES

Journal of the Optical Society of America, vol. 47, January 1957, page 77.